United States Patent
Hadfield et al.

(10) Patent No.: US 11,098,465 B2
(45) Date of Patent: Aug. 24, 2021

(54) FAUCET ASSEMBLY WITH FRICTION RING

(71) Applicant: Kohler Co., Kohler, WI (US)

(72) Inventors: Brad R. Hadfield, Port Washington, WI (US); Perry D. Erickson, Sheboygan, WI (US); David E. Hansen, Howards Grove, WI (US)

(73) Assignee: KOHLER CO., Kohler, WI (US)

(*) Notice: Subject to any disclaimer, the term of this patent is extended or adjusted under 35 U.S.C. 154(b) by 0 days.

(21) Appl. No.: 16/368,177

(22) Filed: Mar. 28, 2019

(65) Prior Publication Data
US 2020/0308813 A1 Oct. 1, 2020

(51) Int. Cl.
*E03C 1/04* (2006.01)
*F16K 11/074* (2006.01)
*F16K 31/60* (2006.01)

(52) U.S. Cl.
CPC .......... *E03C 1/0404* (2013.01); *E03C 1/0412* (2013.01); *F16K 11/074* (2013.01); *F16K 31/602* (2013.01)

(58) Field of Classification Search
CPC .... E03C 1/0412; E03C 1/0404; F16K 11/074; F16K 31/602; Y10T 137/6021
See application file for complete search history.

(56) References Cited

U.S. PATENT DOCUMENTS

| | | |
|---|---|---|
| 4,219,184 A | 8/1980 | Crawford et al. |
| 4,678,002 A * | 7/1987 | Valley ..................... F16K 41/04 137/315.13 |
| 5,048,792 A | 9/1991 | Fischer |
| 5,522,429 A | 6/1996 | Bechte et al. |
| 5,592,971 A | 1/1997 | Knapp |
| 6,796,544 B1 | 9/2004 | Chen |
| 7,032,272 B2 | 4/2006 | Haenlein |
| 7,219,696 B2 | 5/2007 | Cattaneo |
| 9,464,417 B2 | 10/2016 | Chen |
| 2015/0152975 A1* | 6/2015 | Jonte ..................... F16K 31/602 251/208 |

FOREIGN PATENT DOCUMENTS

WO    WO/2000/000765    1/2000

* cited by examiner

*Primary Examiner* — Kevin R Barss
(74) *Attorney, Agent, or Firm* — Foley & Lardner LLP

(57) ABSTRACT

Disclosed is a friction ring including a body and a contact member. The body is configured to couple the friction ring to at least one of a faucet assembly or a faucet valve assembly. The contact member is disposed on the body. The contact member is configured to slidably engage with a valve stem of the faucet valve assembly. The contact member is further configured to press against the valve stem to increase a frictional force between the contact member and the valve stem over a full range of movement of the valve stem.

18 Claims, 7 Drawing Sheets

FAUCET ASSEMBLY WITH FRICTION RING

BACKGROUND

The present disclosure relates generally to a faucet assembly. More specifically, the present disclosure relates to a faucet assembly that incorporates a friction ring.

Existing faucet assemblies include valve assemblies to control a temperature and/or flow rate of water delivered from the faucet assemblies. The valve assemblies include a valve stem that is fastened or otherwise coupled to a faucet handle. A user may manually manipulate the faucet handle to reposition the valve stem and thereby selectively control the flow rate of water through the valve assembly. These faucet valve assemblies rely on internal friction between the valve stem and other parts of the valve assembly to maintain the position of the faucet handle after adjustment. If the internal friction within the valve assembly is insufficient, gravity acting on the faucet handle can cause the handle to move under its own weight, resulting in self-movement of the valve stem toward an open or closed position. In order to prevent the handle from moving under its own weight, the size and shape of the handle must be carefully controlled.

It would be advantageous to provide a faucet that addresses this and other concerns.

SUMMARY

One embodiment of the present disclosure relates to a friction ring. The friction ring includes a body and a contact member. The body is configured to couple the friction ring to at least one of a faucet assembly or a faucet valve assembly. The contact member is disposed on the body and is configured to slidably engage with a valve stem of the faucet valve assembly. The contact member is configured to press against the valve stem to increase a friction force between the contact member and the valve stem over a full range of movement of the valve stem. In some embodiments, the body defines an opening configured to receive the valve stem. The contact member may be configured to apply a contact force to the valve stem in a perpendicular orientation relative to a central axis of the valve stem.

Another embodiment of the present disclosure relates to a faucet assembly. The faucet assembly includes a faucet body, a faucet valve assembly, a faucet handle, and a friction ring. The faucet valve assembly is disposed substantially within the faucet body. The faucet valve assembly includes a valve stem extending through a body opening in the faucet body. The valve stem is pivotably coupled to the faucet valve assembly. The faucet handle is coupled to the valve stem. The friction ring is coupled to at least one of the faucet valve assembly or the faucet body. The friction ring is slidably engaged with the valve stem. The friction ring presses against the valve stem to increase a friction force between the contact member and the valve stem over a full range of movement of the valve stem. In some embodiments, the friction ring further includes a body and a contact member disposed on the body. The contact member may press against the valve stem to increase the friction force between the contact member and the valve stem over the full range of movement of the valve stem.

DETAILED DESCRIPTION

Figure 1:
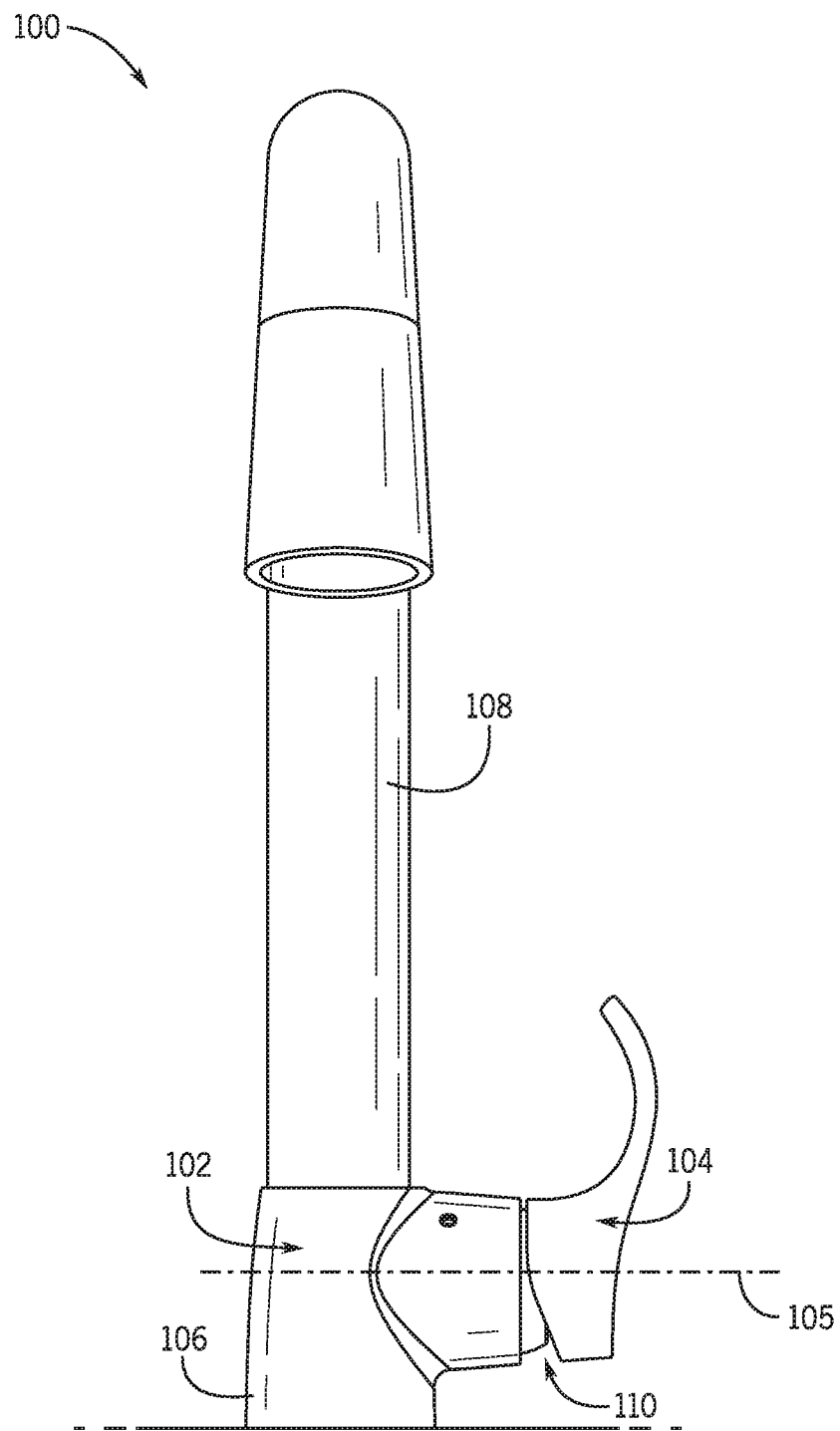
FIG. 1 is a side view of a faucet assembly, according to an exemplary embodiment.

Referring generally to the figures, a faucet assembly includes a faucet body, a faucet valve assembly, and a friction ring. The faucet assembly may be a kitchen faucet mounted behind a sink basin or another faucet type. The faucet valve assembly is configured to selectively control a flow rate of water and/or a temperature of water delivered from the faucet assembly. The faucet valve assembly includes a valve stem and a faucet handle coupled to the valve stem. The faucet handle is fixed in position relative to the valve stem. A user may modify a position of the valve stem by manually manipulating the faucet handle in order to increase or decrease the flow rate of water delivered from the faucet assembly to the sink basin or another location.

The friction ring is coupled to at least one of the valve assembly or the faucet body (e.g., the friction ring may be coupled to the valve assembly independently from the faucet body, to the faucet body independently from the valve assembly, or to both the valve assembly and the faucet body). The friction ring is configured to press against the valve stem to increase a frictional force between the friction ring and the valve stem over a full range of movement of the valve stem (e.g., from a fully open position to a fully closed position). Among other benefits, the frictional force provided by the friction ring prevents self-movement of the valve stem relative the faucet valve assembly. For example, the frictional force prevents the valve stem from moving from an open position to a closed position, or vice versa depending on the orientation of the valve assembly, under the weight of the valve stem and/or the faucet handle. Among other benefits, the friction ring increases the force required to actuate the faucet handle (e.g., the valve stem) and thereby minimizes limitations on faucet handle design (e.g., the size of the handle, the weight of the handle, the geometry of the handle, etc.).

According to an exemplary embodiment, the friction ring includes a body and a contact member disposed on the body. The contact member may be integrally formed with the body as a single unitary structure in order to reduce the manufacturing complexity and the associated costs. The body may define an opening configured to receive the valve stem therein such that the body at least partially surrounds the valve stem. In various exemplary embodiments, the contact member is one of a plurality of contact members. For example, the contact member may be one of two contact members configured to slidably engage with the valve stem on opposing sides of the valve stem. In other words, the contact members may define a gap configured to receive the valve stem therein. A width of the gap, between the contact members, may be less than a width of the valve stem such that the contact members deform when the friction ring is engaged with the valve stem.

In some embodiments, the contact member is configured to apply a contact force to the valve stem in a substantially perpendicular orientation relative to a central axis of the valve stem over the full range of movement of the valve stem. The contact member may be configured to deform in response to the contact force between the friction ring and the valve stem. The contact member may define an aperture whose size varies in response to the contact force between the contact member and the valve stem. Among other benefits, the aperture provides compliance to the contact member, thereby allowing the friction ring to accommodate a larger tolerance range for the valve stem. The compliance of the contact member also prevents the contact force between the friction ring and the valve stem from decreasing over time, which might otherwise occur due to surface wear of the contact member. In various embodiments, the contact member includes an arcuate wall (e.g., a curved wall) extending at least partially radially inward toward a central axis of the friction ring (e.g., a central axis of the opening defined by the friction ring). The arcuate wall may be curved inward toward the central axis of the friction ring and the valve stem. The contact force between the contact member and the valve stem is a function of the size of the aperture and a wall thickness of the contact member. These and other advantageous features will become apparent to those reviewing the present disclosure and figures.

Referring to FIG. 1, a faucet assembly 100 is shown, according to an exemplary embodiment. The faucet assembly 100 may be a kitchen faucet, a bathroom faucet, or the like. The faucet assembly 100 is configured to receive water from a water supply conduit (not shown). The water supply conduit may include, or be coupled to, a water supply line inside a household, a commercial property, or another type of building. The water supply conduit may be configured to supply water at a city water pressure or a well pump pressure. The water supply conduit may be a pipe, tube, or another water delivery mechanism extending from the water supply line through a wall of the building.

Figure 2:
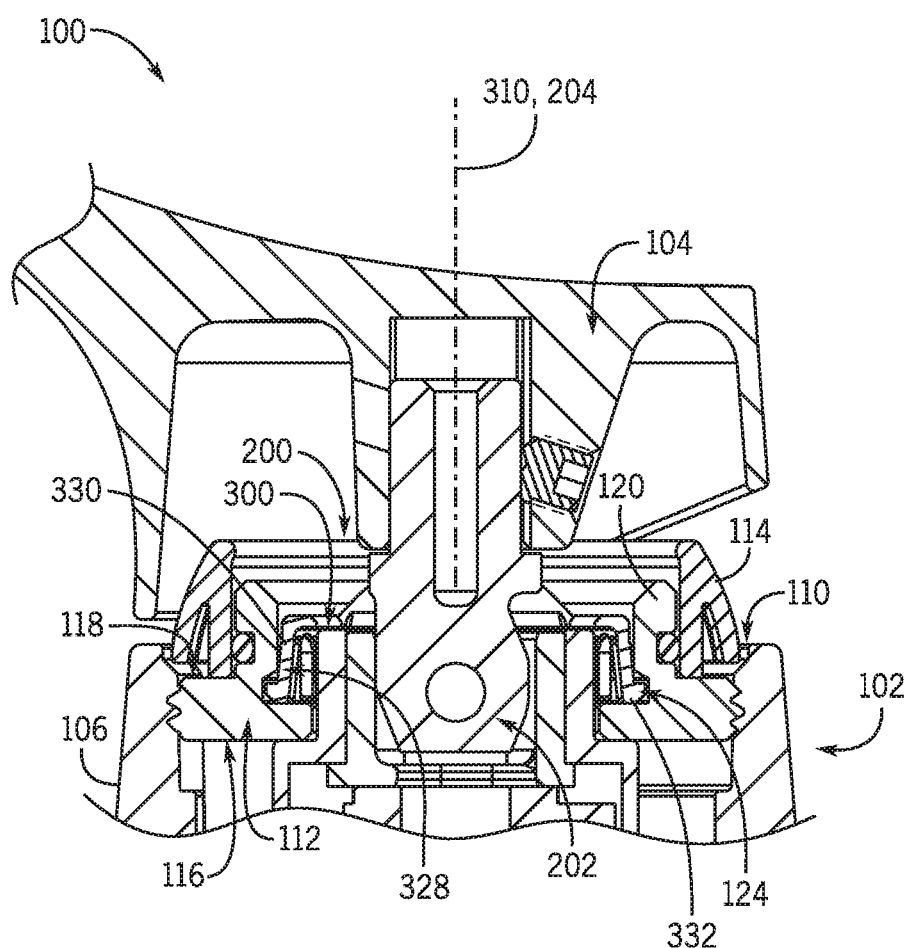
FIG. 2 is a side sectional view of a faucet valve assembly for the faucet assembly of FIG. 1, according to an exemplary embodiment.

As shown in FIGS. 1 and 2, the faucet assembly 100 includes a faucet body 102, a faucet valve assembly 200, and a faucet handle 104. The faucet body 102 includes a faucet base 106 and a faucet spout 108 rotatably coupled to the base 106 such that the spout 108 may swivel relative to the base 106 (e.g., to rotate about an axis perpendicular to an opening of a sink basin, etc.) to provide water to different parts of a sink basin. According to another exemplary embodiment, the faucet spout 108 may be fixedly coupled to the base instead of rotatably coupled thereto. The faucet base 106 is coupled to a mounting location for the faucet assembly 100 (e.g., a countertop, a rear mounting ledge of a kitchen or bathroom sink, a laundry room sink, or another suitable location).

The faucet valve assembly 200 is disposed substantially within the faucet body 102 (e.g., the faucet base 106) and is coupled to the faucet body 102. In the exemplary embodiment of FIG. 1, the valve assembly 200 is arranged in substantially perpendicular orientation relative to the faucet body 102 (e.g., horizontally relative to ground, left-to-right as shown in FIG. 1, in substantially parallel orientation relative to a mounting surface of the mounting location, etc.). In other embodiments, the orientation of the valve assembly 200 relative to the faucet body 102 and/or the mounting location may be different. For example, the valve assembly 200 may be arranged at an angle relative to the faucet body or in a substantially parallel orientation relative to the body 102 (e.g., vertically relative to ground, etc.); for example, in a lower profile faucet such as in a bathroom faucet assembly, or the like.

The valve assembly 200 is configured to selectively control a flow rate of water and/or a temperature of water delivered from the water supply conduit to the faucet assembly 100. The valve assembly 200 may include a cartridge valve or another suitable valve type. The faucet handle 104 is coupled to the valve assembly 200. FIG. 2 depicts a cross-sectional view through an outer end of the valve assembly 200. As shown in FIG. 2, the valve assembly 200 includes a valve stem 202 extending through a body opening 110 in the faucet base 106. The faucet handle 104 is coupled to the valve stem 202. The handle 104 includes an inner wall defining a generally rectangular-shaped recessed area. The recessed area is configured to receive the valve stem 202 and to secure the position of the valve stem 202 relative to the handle 104. According to other exemplary embodiments the configuration of the valve assembly 200 may differ from that shown.

The handle 104 additionally includes a through-hole extending through a side of the inner wall. As shown in FIG. 2, the through-hole is configured to receive a set screw or another fastener, which engages an outer surface of the valve stem 202 to couple the valve stem 202 to the handle 104 and to prevent separation of the valve stem 202 from the handle 104 during use. In other embodiments, other fasteners or handle geometries may be used to facilitate coupling of the valve stem 202 to the handle 104.

The valve stem 202 is pivotably coupled to the faucet valve assembly 200 and moves relative to the faucet valve assembly 200 to control the flow rate and/or temperature of water delivered to the faucet assembly 100. In the exemplary embodiment of FIG. 1, the flow rate of water may be controlled by moving an outer end of the handle 104 (e.g., a lever of the handle 104) outwardly from the faucet spout 108, and thereby pivot the valve stem 202 relative to the valve assembly 200. The temperature of water delivered to the faucet assembly 100 is controlled by rotating the handle 104 about a central axis 105 through the valve assembly 200 (e.g., into and out of the page as shown in FIG. 1). FIG. 2 shows the handle 104 and the valve stem 202 in a closed position in which water is prevented from flowing through the valve assembly 200.

Figure 3:
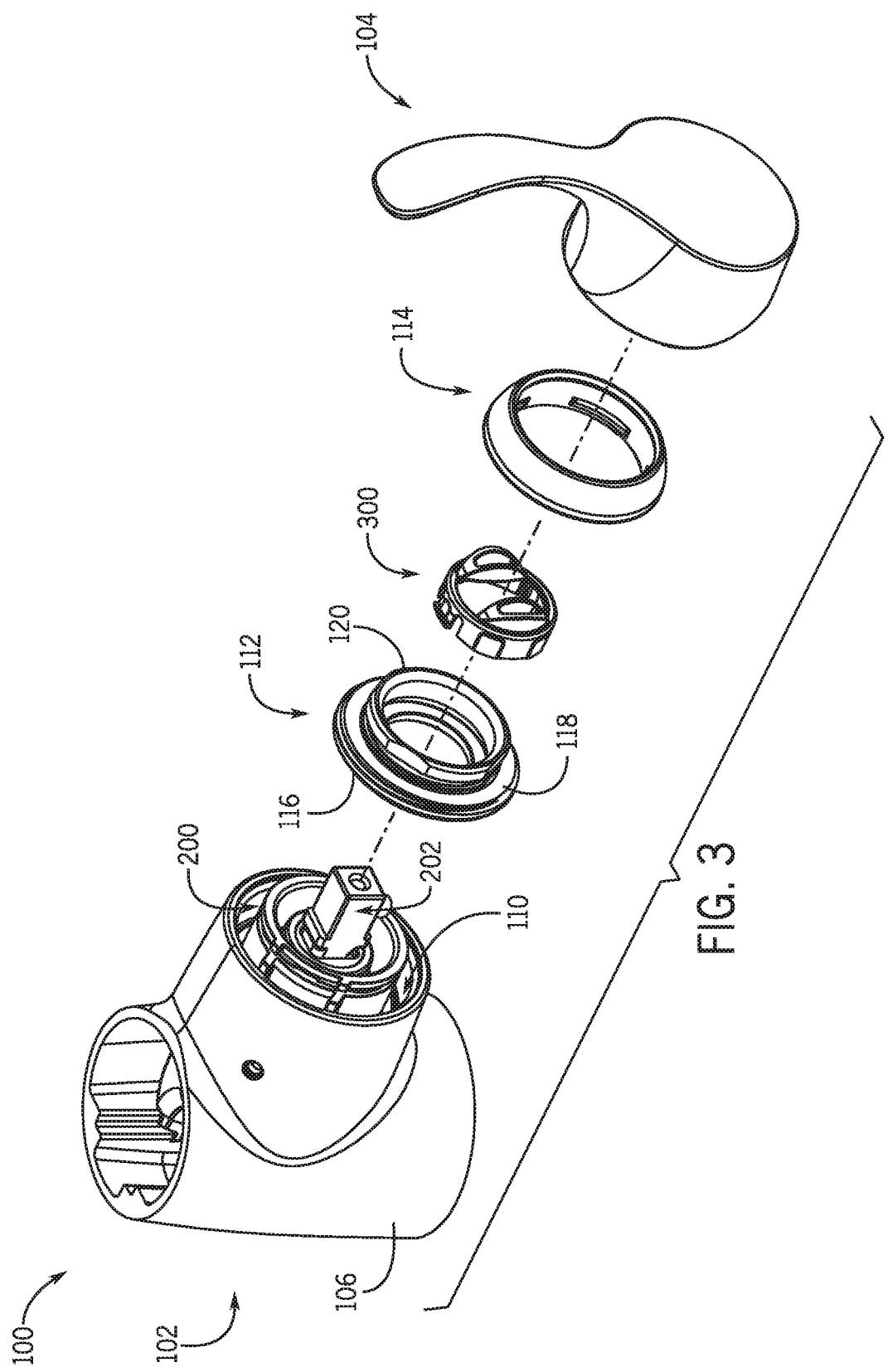
FIG. 3 is a partially exploded view of the faucet valve assembly of FIG. 2, according to an exemplary embodiment.

Referring to FIG. 3, a partially exploded view of the faucet assembly 100 of FIGS. 1-2 is shown, according to an exemplary embodiment. The faucet assembly 100 includes a friction ring 300, a valve nut 112, and an outer support 114. In other embodiments, the faucet assembly 100 may include additional, fewer, and/or different components.

As shown in FIG. 2, the valve nut 112 is threadably coupled to the faucet base 106 along an outer perimeter of the valve nut 112. A first surface 116 of the valve nut 112 (e.g., a lower surface as shown in FIG. 2) engages with and supports the valve assembly 200 in position within the faucet base 106. A second surface 118 of the valve nut 112, opposite the first surface 116, engages with the outer support 114. As shown in FIG. 2, the valve nut 112 includes a generally cylindrically-shaped protrusion, shown as protrusion 120 extending from the second surface 118 in a substantially perpendicular orientation relative to the second surface 118. The outer support 114 is engaged with the protrusion 120 circumferentially along an outer perimeter of the protrusion 120. In other words, the outer support 114 surrounds the valve nut 112 and the valve stem 202, thereby improving the overall aesthetic of the faucet assembly 100 (e.g., preventing a user from viewing the valve nut 112, the valve stem 202, and/or other internal components of the valve assembly 200 along an edge of the handle 104 between the open and closed positions).

The friction ring 300 is disposed substantially within a recessed area defined by the protrusion 120. As shown in FIG. 2, the protrusion 120 at least partially defines a ledge or slot, shown as ledge 124 extending circumferentially along an inner perimeter of the valve nut 112, and disposed at least partially between the first surface 116 and the second surface 118 of the valve nut 112. The friction ring 300 is slidably engaged with the ledge 124 and rotatably couples the friction ring 300 to both the valve assembly 200 and the faucet body 102, such that the friction ring 300 may rotate relative to both the valve assembly 200 and the faucet body 102. Engagement between the friction ring 300 and the valve nut 112 also prevents axial movement of the friction ring 300 relative to the valve stem 202 (e.g., along a central axis 204 of the valve stem 202). In other embodiments, the friction ring 300 may be coupled directly to at least one of the faucet body 102 or the valve assembly 200 (e.g., to the valve assembly 200 independently from the faucet body 102, to the faucet body 102 independently from the valve assembly 200, or to both the valve assembly 200 and the faucet body 102), rather than indirectly through the valve nut 112.

Figure 4:
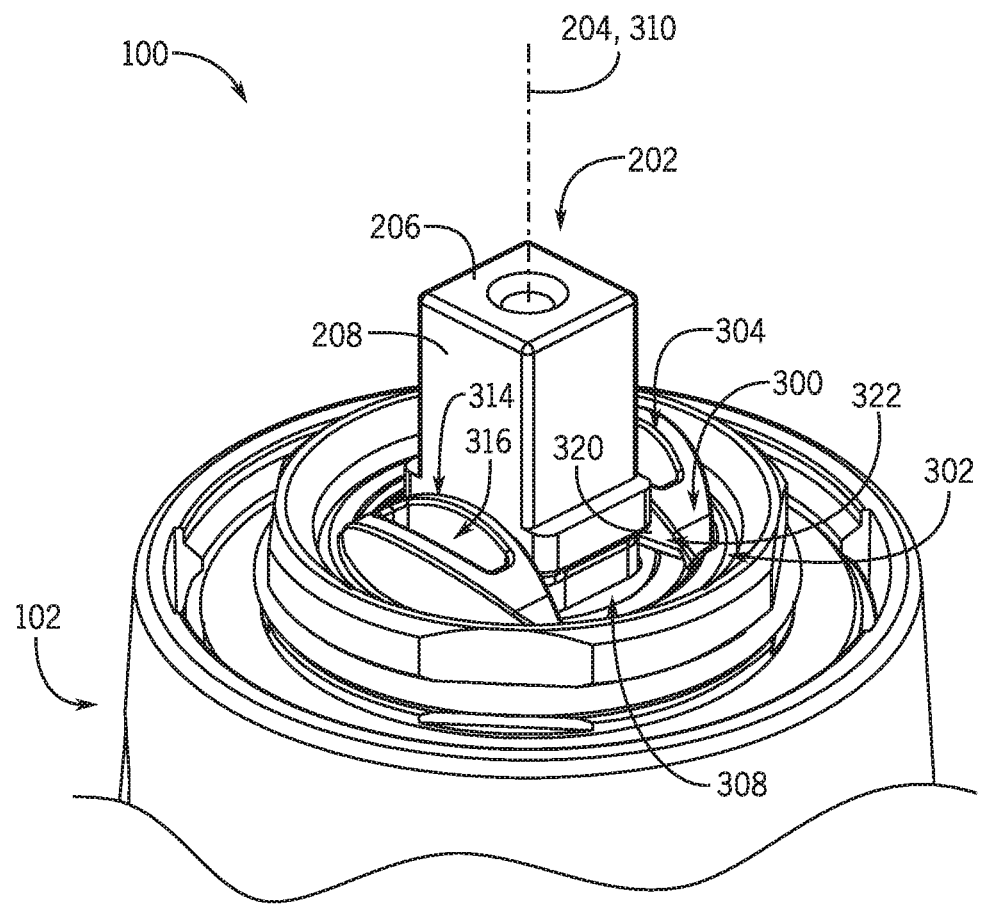
FIG. 4 is a perspective view of the faucet valve assembly of FIG. 2 with a faucet handle removed, according to an exemplary embodiment.

The friction ring 300 is configured to press against the valve stem 202 to increase a frictional force between the friction ring 300 and the valve stem 202 over a full range of movement of the valve stem 202 (e.g., from a fully open to a fully closed position). Referring to FIG. 4, a perspective view of the faucet assembly 100 in an area near the valve stem 202 and friction ring 300 is shown, according to an exemplary embodiment. The faucet assembly 100 is shown isolated from the handle 104 in FIG. 4. As shown, the valve stem 202 includes a top surface 206 and side surfaces 208 in a substantially perpendicular orientation relative to the top surface 206. In the exemplary embodiment of FIG. 4, the top surface 206 is generally rectangular. In other embodiments, the valve stem 202 may be cylindrical or another suitable shape.

As shown in FIG. 4, the friction ring 300 is slidably engaged with the valve stem 202 to allow the valve stem 202 to pivot relative to the friction ring 300 (e.g., so that the valve stem 202 may move along a gap 322 defined by the friction ring 300). In the exemplary embodiment of FIG. 4, the friction ring 300 applies a contact force to the valve stem 202 in a substantially perpendicular orientation relative to the central axis 204 of the valve stem 202. The contact force between the friction ring 300 and the valve stem 202 deforms the friction ring 300 and increases the frictional force resisting movement of the valve stem 202 relative to the friction ring 300. Among other benefits, the frictional force between the friction ring 300 and the valve stem 202 prevents self-movement of the valve stem 202 (e.g., movement of the valve stem 202 from an open position to a closed position, or vice versa, depending of the orientation of the faucet handle 104 and the valve stem 202) under an applied force resulting from a combined weight of the faucet handle 104 and the valve stem 202. As shown in FIG. 4, the friction ring 300 is configured to press against the valve stem 202 over the full range of movement of the valve stem 202 (e.g., over an infinite number of valve stem positions relative to the friction ring 300). In this way, a user is allowed to make fine adjustments to the handle 104 position, and the corresponding flow rate of water provided at each position, without needing to continuously readjust the handle 104 position to maintain the specified flow rate through the valve assembly 200.

Referring to FIGS. 5-10, various views of the friction ring 300 are shown, according to an exemplary embodiment. The friction ring 300 includes a body 302 and a plurality of contact members 304 disposed thereon. The body 302 includes a generally cylindrically-shaped wall 306 defining an opening 308. As shown in FIG. 4, the valve stem 202 is received within the opening 308 and extends through the opening 308, such that the body 302 substantially surrounds the valve stem 202.

As shown in FIGS. 5-10, the friction ring 300 includes two contact members 304. In other exemplary embodiments, additional or fewer contact members 304 may be included. As shown in FIG. 4, the contact members 304 are slidably engaged with the valve stem 202 on opposing side surfaces 208 of the valve stem 202. Among other benefits, using a plurality of contact members 304, in pairs positioned at opposite sides of the valve stem 202 (see also FIG. 4), balances the lateral forces on the valve stem 202 (e.g., forces oriented substantially perpendicular to the central axis 204 of the valve stem 202).

Figure 5:
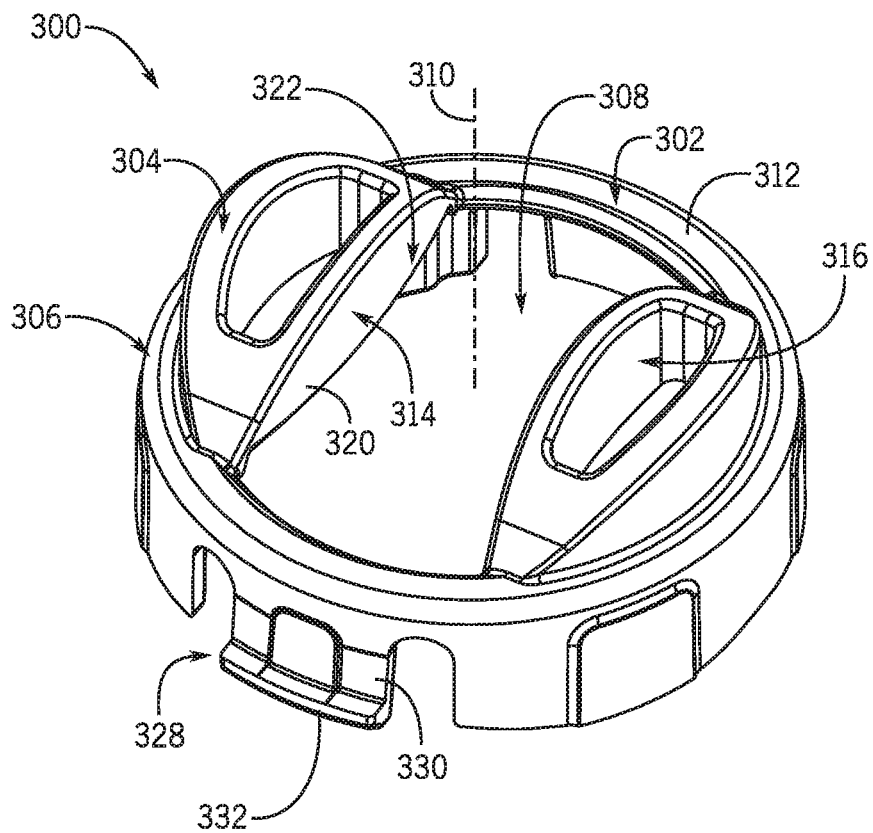
FIG. 5 is a top perspective view of a friction ring for a faucet assembly, according to an exemplary embodiment.
Figure 6:
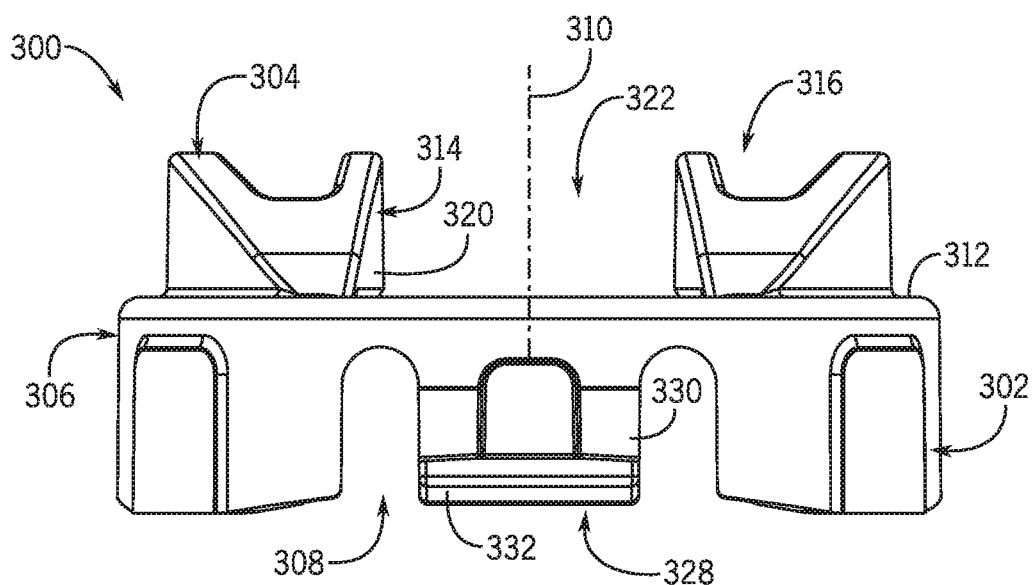
FIG. 6 is a side view of the friction ring of FIG. 5, according to an exemplary embodiment.

As shown in FIG. 6, each one of the contact members 304 extends upwardly (e.g., vertically as shown in FIG. 6) and inwardly (e.g., radially inwardly relative to a central axis 310 of the friction ring 300) from a generally planar upper surface 312 of the body 302. The contact members 304 are made from a flexible and deformable material, such as plastic, which provides good durability under repeated loading and has a lower coefficient of static friction as compared to other flexible materials such as aluminum and other metals. Among other benefits, a lower coefficient of static friction makes it easier to make fine adjustments to the position of the valve stem 202 relative to the friction ring 300. In the exemplary embodiment of FIGS. 5-10, the contact members 304 are integrally formed with the body 302 as a single unitary structure (e.g., via injection molding or another suitable forming process), which, advantageously, reduces manufacturing complexity and the associated cost as compared to a multi-piece friction ring in which the contact members would need to be separately formed and assembled to the body.

Figure 7:
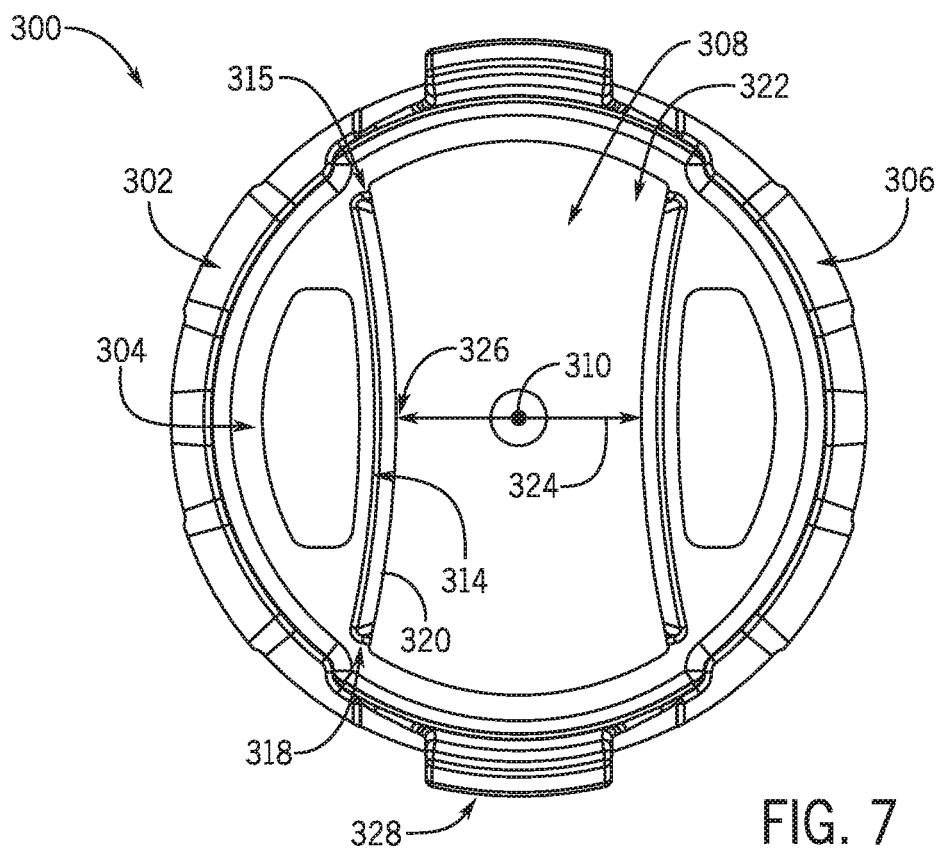
FIG. 7 is a bottom view of the friction ring of FIG. 5, according to an exemplary embodiment.
Figure 8:
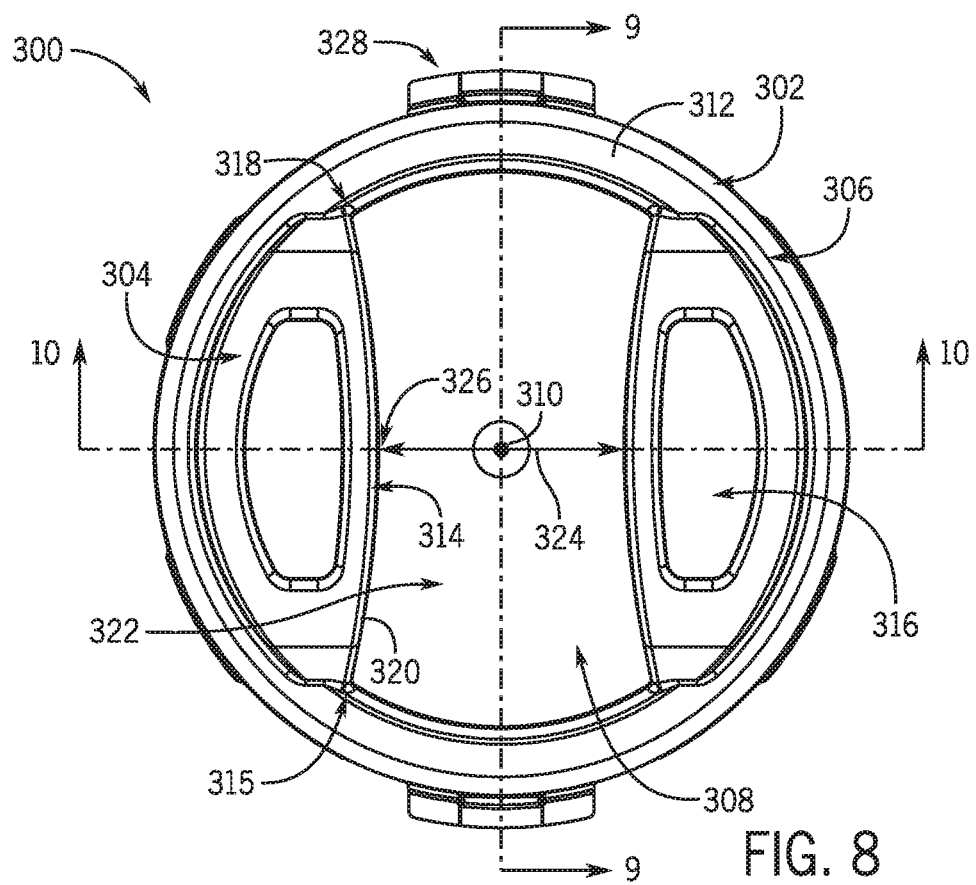
FIG. 8 is a top view of the friction ring of FIG. 5, according to an exemplary embodiment.
Figure 9:
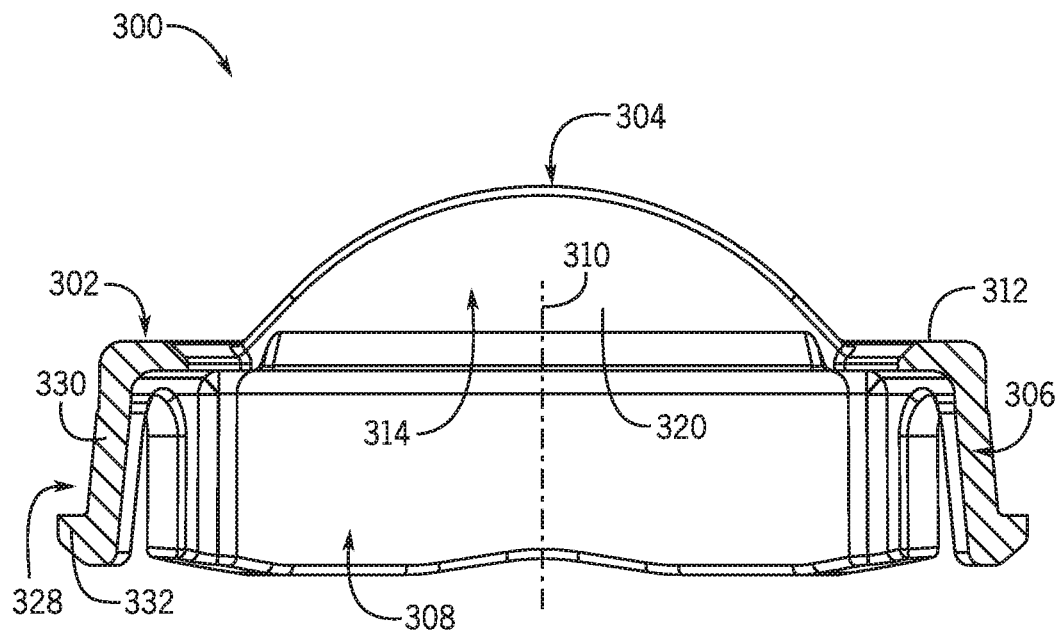
FIG. 9 is a side sectional view of the friction ring of FIG. 5, according to an exemplary embodiment.

As shown in FIGS. 7-8, each of the contact members 304 includes an arcuate wall 314 having a first end 315 and a second end 318. Both the first end 315 and the second end 318 are coupled to the body 302. The arcuate wall 314 is curved inwardly (e.g., laterally inward, radially inward relative to the central axis 310 of the friction ring 300, etc.) away from the body 302 toward the valve stem 202. As shown in FIG. 9, the arcuate wall 314 is also curved upwardly, in a substantially parallel orientation relative to the central axis 310 of the friction ring 300, which, advantageously, increases an area of contact between the friction ring 300 and the valve stem 202 (see also FIG. 4).

The arcuate wall 314 defines an aperture 316. As shown in FIGS. 7-8, the aperture 316 includes a through-hole extending through the contact member 304 in substantially parallel orientation relative to the central axis 310 of the friction ring 300. A size of the aperture 316 is configured to decrease in response to deformation or flexing of arcuate wall 314 (e.g., in response to the contact force between the contact member 304 and the valve stem 202). As shown in FIG. 4, the valve stem 202 presses against an inner surface 320 of the arcuate wall 314 of each one of the contact members 304. The arcuate walls 314 deform outwardly (e.g., radially outward relative to the central axis 310 of the friction ring 300) toward the body 302 in response to the contact force between the contact member 304 and the valve stem 202, thereby reducing the size of the aperture 316. Together, the arcuate wall 314 and the aperture 316 provide compliance to the friction ring 300, thereby allowing the friction ring 300 to accommodate a larger tolerance range for the valve stem 202 without significantly impacting the contact force between the friction ring 300 (e.g., the contact member 304) and the valve stem 202.

Figure 10:
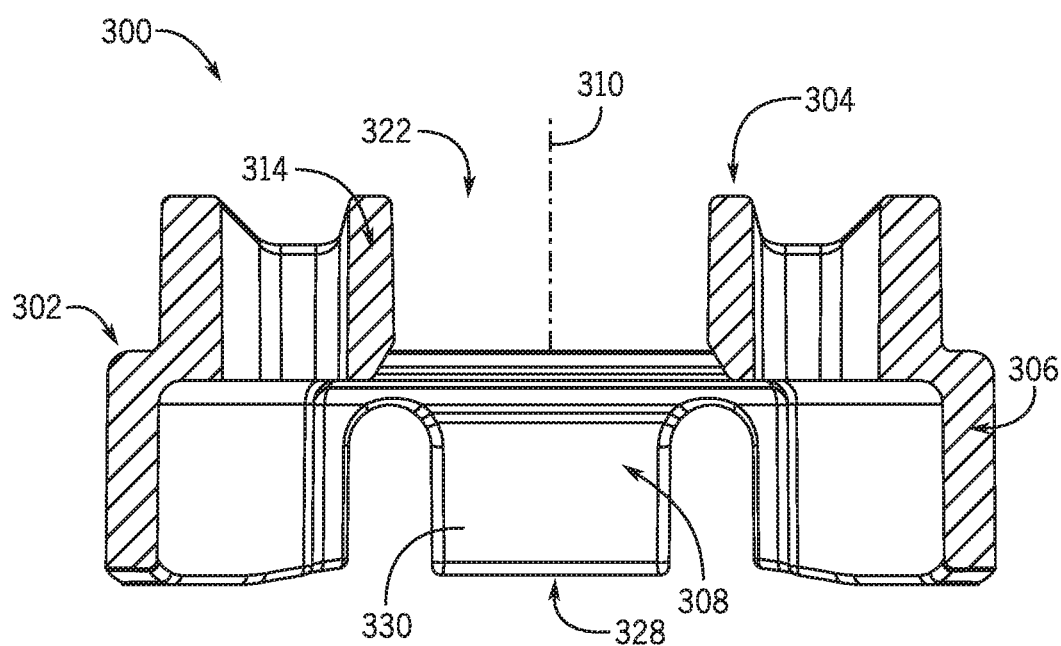
FIG. 10 is another side sectional view of the friction ring of FIG. 5, according to an exemplary embodiment.

As shown in FIGS. 7-8 and 10, together, the contact members 304 (e.g., the inner surface 320) form a gap 322 configured to receive the valve stem 202 therein (see also FIG. 4). As shown in FIGS. 7-8, a width 324 of the gap 322, between the inner surface 320 of each of the contact members 304, increases with increasing distance from the central axis 310 of the friction ring 300 (e.g., laterally away from the central axis 310, at larger radial positions from the central axis 310, etc.). As shown in FIG. 4, the valve stem 202 contacts the inner surface 320 of each one of the contact members 304 (e.g., the arcuate walls 314) at a central position within the gap 322 along a full range of motion of the valve stem 202 relative to the friction ring 300 (e.g., from a fully open position to a fully closed position, etc.). A position at which the valve stem 202 contacts the inner surface 320 of each one of the contact members 304 is shown as contact position 326 in FIGS. 7-8. In other words, the size of the aperture 316 is approximately constant throughout the full range of motion of the valve stem 202, which, advantageously, results in a nearly constant frictional force between the friction ring 300 and the valve stem 202.

Referring to FIGS. 5-6 and 9, the friction ring 300 includes a latch 328 extending at least partially radially outwardly from the central axis 310 of the friction ring 300 (e.g., in a lateral direction) such that it protrudes beyond an outer perimeter of the body 302. In the exemplary embodiment of FIG. 5 (see also FIG. 2), the latch 328 is configured to rotatably couple the friction ring 300 to both the faucet assembly 100 and the valve assembly 200 such that the friction ring 300 may rotate with the valve stem 202 relative to both the faucet assembly 100 and the valve assembly 200 (e.g., to adjust the temperature of the water delivered to a sink basin by the faucet assembly 100, etc.).

As shown in FIG. 6, the latch 328 includes a flexible portion 330 and a locking tab 332 extending from a free end of the flexible portion 330 (e.g., an end of the flexible portion 330 farthest from the body 302). As shown in FIG. 9, the flexible portion 330 extends partially downwardly from the upper surface 312 of the body 302 and also partially radially outwardly from the central axis 310 of the friction ring 300. As shown in FIG. 2, the flexible portion 330 is configured to deform during insertion of the friction ring 300 axially (e.g., downwardly as shown in FIG. 2) into the valve nut 112. Once the friction ring 300 is fully inserted into the valve nut 112, the flexible portion 330 urges the locking tab 332 outwardly into the ledge 124, thereby securing an axial position, parallel to the central axis 310 of the friction ring 300, of the friction ring 300 relative to the valve assembly 200. As shown in FIGS. 2 and 9, the friction ring 300 includes a plurality of latches 328 in order to more fully secure the axial position of the friction ring 300 relative to the valve assembly 200. As shown in FIG. 2, the locking tab 332 is slidably engaged with the ledge 124, which, advantageously, allows the friction ring 300 to rotate with the valve stem 202 relative to the valve assembly 200.

The size, shape, and arrangement of features described with reference to the friction ring 300 of FIGS. 5-10 should not be considered limiting. Many alternatives are possible without departing from the inventive concepts disclosed herein. For example, the friction ring 300 may be modified to include additional or fewer contact members 304. The geometry of each contact member 304 (e.g., the curvature of the arcuate wall 314 of each one of the contact members 304, a number of arcuate walls 314, etc.) may also differ in various exemplary embodiments. The geometry of the contact members 304 may also be adjusted to accommodate different handle geometries and weights (e.g., to provide greater contact force for heavier handles, to reduce the force required to open and close the valve for smaller handles, etc.).

The faucet assembly, of which various exemplary embodiments are disclosed herein, provides several advantages over existing faucet assemblies. The faucet assembly includes a valve assembly including a valve stem. The faucet valve assembly is configured to control a flow rate of water and/or a temperature of water through the valve assembly based on a position of the valve stem. The faucet assembly additionally includes a friction ring slidably engaged with the valve stem. The friction ring presses against the valve stem to increase a frictional force between the friction ring and the valve stem over a full range of movement of the valve stem. The frictional force provided by the friction ring prevents self-movement of the valve stem relative to the valve assembly under the weight of the handle over the full range of movement of the valve stem, thereby minimizing limitations on faucet handle design.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A friction ring comprising:
   a body configured to couple the friction ring to at least one of a faucet assembly or a faucet valve assembly, wherein the body defines an opening configured to receive a valve stem of the faucet valve assembly; and
   a contact member disposed on the body, the contact member configured to slidably engage with the valve stem, wherein the contact member is configured to press against the valve stem to increase a frictional force between the contact member and the valve stem over a full range of movement of the valve stem, wherein the contact member comprises an arcuate wall, and wherein the arcuate wall is curved inward toward a central axis of the opening.

2. The friction ring of claim 1, wherein the contact member is configured to apply a contact force to the valve stem in a substantially perpendicular orientation relative to a central axis of the valve stem.

3. The friction ring of claim 1, wherein the contact member defines an aperture, and wherein a size of the aperture is configured to decrease in response to a contact force between the contact member and the valve stem.

4. The friction ring of claim 1, wherein the contact member is configured to deform away from the valve stem in response to a contact force between the contact member and the valve stem.

5. The friction ring of claim 1, wherein the contact member is one of a plurality of contact members disposed on the body, and wherein two of the contact members are configured to slidably engage with the valve stem on opposing sides of the valve stem.

6. The friction ring of claim 5, wherein the two contact members together define a gap, and wherein a width of the gap between the contact members increases with increasing distance from a central axis of the body.

7. The friction ring of claim 1, further comprising a latch disposed on the body and extending radially outward from a central axis of the body, and wherein the latch is configured to rotatably couple the friction ring to at least one of the faucet assembly or the faucet valve assembly.

8. The friction ring of claim 1, wherein the contact member is integrally formed with the body as a single unitary structure.

9. A friction ring comprising:
   a body configured to couple the friction ring to at least one of a faucet assembly or a faucet valve assembly; and
   a contact member disposed on the body, the contact member configured to slidably engage with a valve stem of the faucet valve assembly, wherein the contact member is configured to press against the valve stem to increase a frictional force between the contact member and the valve stem over a full range of movement of the valve stem, and wherein the friction ring is configured to prevent self-movement of the valve stem under an applied force resulting from a weight of a faucet handle that is coupled to the valve stem.

10. A faucet assembly, comprising:
    a faucet body;
    a faucet valve assembly disposed substantially within the faucet body, the faucet valve assembly comprising a valve stem extending through a body opening in the faucet body, the valve stem pivotably coupled to the faucet valve assembly;
    a faucet handle coupled to the valve stem; and
    a friction ring coupled to at least one of the faucet valve assembly or the faucet body, wherein the friction ring includes a body and a contact member disposed on the body, wherein the contact member is slidably engaged with the valve stem, wherein the contact member presses against the valve stem to increase a frictional force between the friction ring and the valve stem over a full range of movement of the valve stem, wherein the contact member comprises an arcuate wall, and wherein the arcuate wall is curved inward toward a central axis of the body.

11. The faucet assembly of claim 10, wherein the body defines an opening, wherein the valve stem is received within the opening and extends through the opening, and wherein the contact member applies a contact force to the valve stem in a substantially perpendicular orientation relative to a central axis of the valve stem.

12. The faucet assembly of claim 10, wherein the arcuate wall is curved inward toward the valve stem.

13. The faucet assembly of claim 10, wherein the contact member defines an aperture, and wherein a size of the aperture decreases in response to a contact force between the contact member and the valve stem.

14. The faucet assembly of claim 10, wherein the valve stem presses against the contact member to deform the contact member.

15. The faucet assembly of claim 10, wherein the contact member is one of a plurality of contact members disposed on the body, and wherein two of the contact members slidably engage with the valve stem on opposing sides of the valve stem.

16. The faucet assembly of claim 15, wherein the two contact members together define a gap, and wherein a width of the gap between the contact members increases with increasing distance from a central axis of the body.

17. The faucet assembly of claim 10, wherein the friction ring comprises a latch extending radially outward from a central axis of the friction ring, and wherein the latch rotatably couples the friction ring to at least one of the faucet assembly and the faucet valve assembly.

18. A faucet assembly comprising:
a faucet body;
a faucet valve assembly disposed substantially within the faucet body, the faucet valve assembly comprising a valve stem extending through a body opening in the faucet body, the valve stem pivotably coupled to the faucet valve assembly;
a faucet handle coupled to the valve stem; and
a friction ring coupled to at least one of the faucet valve assembly or the faucet body, wherein the friction ring is slidably engaged with the valve stem, wherein the friction ring presses against the valve stem to increase a frictional force between the friction ring and the valve stem over a full range of movement of the valve stem, and wherein the friction ring is configured to prevent self-movement of the valve stem under an applied force resulting from a weight of the faucet handle.

* * * * *